3,440,316
METHOD OF MANUFACTURING IMPROVED
POLYVINYL ALCOHOL FILMS
Shunji Miyake and Katsuaki Hirano, Kurashiki-shi, Japan, assignors to Kurashiki Rayon Co., Ltd., Okayama Prefecture, Japan, a corporation of Japan
No Drawing. Filed Nov. 24, 1964, Ser. No. 413,618
Claims priority, application Japan, Dec. 5, 1963, 38/65,270
Int. Cl. B29d 7/24; B29g 7/00
U.S. Cl. 264—288         6 Claims

ABSTRACT OF THE DISCLOSURE

A method for manufacturing improved polyvinyl alcohol film is provided wherein the film is preheated, stretched at a temperature above 120° C. to a film area increase of 200% to 1000% and then heat set and wherein the film contains less than 5% by weight of water after preheating.

---

This invention relates to improved polyvinyl alcohol films and methods of manufacturing improved polyvinyl alcohol films, and is more particularly concerned with methods and procedures for manufacturing polyvinyl alcohol films having high strength characteristics and a high Young's modulus and having a satisfactory and high degree of water resistance.

It is known to prepare films from polyvinyl alcohol and said polyvinyl alcohol films have a wide range of utility and use and find many applications in packaging procedures where the polyvinyl alcohol film is used as a packing or packaging film. Generally, the previously prepared and known polyvinyl alcohol films are transparent and have good oil resistance and have very little tendency to develop static electric charges. However, it is well known that problems and difficulties arise with regard to the use of polyvinyl alcohol films and said problems and difficulties are due to certain polyvinyl alcohol film properties or characteristics. For example, polyvinyl alcohol films have less water resistance or less moisture resistance when compared to other plastic films. Because of the poor water resistance characteristics of polyvinyl alcohol films, these films will generally have poor form or dimensional stability when subjected to moisture. These polyvinyl alcohol films tend to absorb a high degree of moisture, especially under conditions of high humidity; resulting in a decrease in the Young's modulus of the film, and consequently, it becomes difficult to handle these films in processing and packaging procedures. Also, it becomes difficult to obtain uniform elongation of these films when they are stretched or when they are subjected to tension during processing or printing operations. These known problems with regard to uniform elongation results in polyvinyl alcohol film having an irregular degree of flexibility or lacking uniform flexibility and presents many difficulties during processing and utilization of the film, as in packaging and printing operations and procedures. To solve these problems and difficulties involved with polyvinyl alcohol films, many procedures and techniques have been proposed and suggested in the prior art. While many of these suggestions and proposals have merit they have not entirely solved all of the problems and difficulties associated with the preparation and processing and utilization of polyvinyl alcohol films.

It is, therefore, an object of this invention to provide polyvinyl alcohol films having improved properties.

Another object of this invention is to provide methods, techniques, and procedures for the preparation of polyvinyl alcohol films having a high degree of water resistance and a high degree of form stability and high Young's modulus values.

These and other objects as well as other advantages and benefits of this invention, and other novel and specific features of this invention, will become apparent, or will be clarified or will be described or specifically detailed, in the following descriptions, illustrations, details, and examples of this invention.

In accordance with this invention, improved polyvinyl alcohol films are prepared by an improved combination of heat treating and elongation or stretching procedures. Polyvinyl alcohol film prepared by extrusion, or other conventional film forming procedures, is first passed through a preheating zone maintained at a temperature from about 60° C. to about 120° C. From the preheating zone the film is passed to a stretching zone maintained at a temperature above 120° C. but below the decomposition temperature of polyvinyl alcohol. While in the stretching zone the film is stretched an amount to obtain a percentage increase in original film area from 200% to 1000%. After the stretching operations, the film is heat set at a temperature within the range of 140° C. to 250° C. By utilizing these procedures it is not necessary to subject the polyvinyl alcohol film to the conventional and separate drying procedures.

In the procedures and methods of this invention, it is desirable that the preheated film passed to the heated stretching zone contain an amount of water below 5% by weight of the film. That is polyvinyl alcohol film that is bone dry or contains no more than 5% by weight of water may be subjected to the preheat treatment. Since in many cases the polyvinyl alcohol film is prepared from an aqueous polyvinyl alcohol mixture by extrusion, the prepared film may contain water in excess of 5% by weight and it is necessary to maintain the preheating conditions to reduce the film water content to below 5% by weight. In any case it is necessary that the film be preheated and the preheated film that is passed to the stretching zone should have a water content below 5% by weight.

The films treated by this invention do not require plasticizers and plasticizers are not required to obtain the benefits and advantages of this invention. To obtain the specific increase in film area during the stretching operation, biaxial stretching procedures may be used or the film may be stretched only in one direction, provided shrinkage in the other direction is prevented.

In preparing polyvinyl alcohol films utilizing stretching procedures, it has been found that no effect of orientation is obtained in the stretched film, if the stretching conditions produce plastic flow of the polyvinyl alcohol molecules in the film. It is desirable, therefore, to produce polyvinyl alcohol film having a desired degree of orientation by stretching the polyvinyl alcohol film with the highest possible degree of tension, but below a point where plastic flow is caused among the polyvinyl alcohol molecules in the film. It has been found that the maximum possible tension applied to the film during the stretching operation varies and is dependent on many factors; such factors include the amount of plasticizers contained in the film, the water content of the film, film temperature during the stretching operations, and the percentage increase in film area produced by stretching. Unexpectedly, it has been found that highly desirable degrees of orientation are obtained in polyvinyl alcohol films with high percentages of film area increases without any plastic flow being obtained in the polyvinyl alcohol molecules of the film. By the procedures of this invention, one is able to produce polyvinyl alcohol film having improved moisture stability properties and improved water resistant properties; and also films having major improvements in mechanical properties, such as the Young's modulus and tensile strength; as well as films having improved overall processing properties and other desirable characteristics.

Since the procedures of this invention allow the use of a high degree of stretching, the manufacturing efficiency of this process is greatly increased compared to previous procedures, and allows the preparation of films, by film forming techniques as extrusion, prior to the treatment, with larger values of film thickness.

The following examples are illustrative of the inventive and improved materials, compositions, procedures, and techniques of this invention and are for the purposes of illustration and are not intended to limit the area or scope of the invention.

Example 1

A mixture of polyvinyl alcohol, having a degree of polymerization of 1750, and water was passed through a film extruder to prepare polyvinyl alcohol film. The prepared film contained 43% by weight water and was then passed over a preheating roller maintained at 90° C. Passage of the film over the preheating roller resulted in a film having a water content of 4.2% by weight. The film was then passed to a stretching zone maintained at 155° C., where the film was biaxially stretched to an area increase value of 250%. The stretched film was then heat set in a heat setting zone at 180° C. for 35 seconds. The film product obtained after heat setting was found to have a tensile strength of 10.5 kg./mm.$^2$ and an elongation of 160% and a Young's modulus of 530 kg./mm.$^2$. Samples of this film were immersed in water and showed a percentage expansion in water of 10.8%.

For comparison purposes another film was prepared utilizing the previously described procedures, but omitting the stretching operation. The comparison film product had a tensile strength of 5.3 kg./mm.$^2$, an elongation of 320% and a Young's modulus of 130 kg./mm.$^2$, and the percentage expansion of this film in water was 24.2%.

Example 2

Polyvinyl alcohol film was prepared from polyvinyl alcohol having a degree of polymerization of 3300. The prepared film contained 38.0% of water and was passed over a preheating roller maintained at 120° C. to obtain a film having a moisture content below 5%. The preheated film was then biaxially stretched at a temperature of 200° C. to an area increase of 650%. The stretched film was then heat set at 205° C. for 10 seconds. The obtained film product had a tensile strength of 13.6 kg./mm.$^2$, an elongation of 93%, a Young's modulus of 890 kg./mm.$^2$, and the percentage of expansion in water of the film was 7.3%.

While preferred embodiments of this invention have been described and illustrated, it is to be understood that satisfactory different modifications of the invention may be made without departing from the spirit and scope of the invention. The invention is not to be limited by the foregoing details or description and foregoing examples.

We claim:
1. A method of manufacturing improved polyvinyl alcohol films which comprises,
   passing a polyvinyl alcohol film through a preheating zone maintained at a temperature within the range of about 60° C. to about 120° C.;
      said film after said preheating containing less than 5% by weight of water;
      stretching said preheated film at a temperature above 120° C. but below the decomposition temperature of polyvinyl alcohol to increase the film area to an amount of 200% to 1000% of said film area prior to stretching;
      and heat setting said stretched film at a temperature within the range of 140° C. to 250° C.
2. A method according to claim 1, wherein said film prior to preheating contains less than 5% by weight of water.
3. A method according to claim 1, wherein said film prior to preheating contains more than 5% by weight water and is prepared by the extrusion of a mixture of polyvinyl alcohol and water.
4. A method according to claim 1, wherein said film area increase is obtained by biaxially stretching.
5. A method according to claim 1, wherein said film area increase is obtained by stretching said film in one direction while preventing film shrinkage in the other direction.
6. A method according to claim 1, wherein the degree of stretching produces orientation of the film.

References Cited

UNITED STATES PATENTS 3,261,104   7/1966   Sakakibara et al. ____ 264—185

FOREIGN PATENTS 895,390   5/1952   Great Britain

JULIUS FROME, Primary Examiner.

HERBERT MINTZ, Assistant Examiner.

U.S. Cl. X.R.

264—185, 289